(12) United States Patent
Guo (10) Patent No.: US 9,066,165 B2
(45) Date of Patent: Jun. 23, 2015

(54) GIGABIT-CAPABLE PASSIVE OPTICAL NETWORK (GPON) SYSTEM AND POINT-TO-POINT PROTOCOL OVER ETHERNET (PPPOE) CONFIGURATION METHOD IMPLEMENTED THEREBY

(75) Inventor: Hongjian Guo, Guangdong Province (CN)

(73) Assignee: ZTE Corporation, Shenzhen, Guangdong (CN)

( * ) Notice: Subject to any disclaimer, the term of this patent is extended or adjusted under 35 U.S.C. 154(b) by 145 days.

(21) Appl. No.: 13/641,447

(22) PCT Filed: Dec. 2, 2010

(86) PCT No.: PCT/CN2010/079387
§ 371 (c)(1),
(2), (4) Date: Nov. 13, 2012

(87) PCT Pub. No.: WO2011/127735
PCT Pub. Date: Oct. 20, 2011

(65) Prior Publication Data
US 2013/0058654 A1 Mar. 7, 2013

(30) Foreign Application Priority Data
Apr. 15, 2010 (CN) .......................... 2010 1 0149796

(51) Int. Cl.
*H04Q 11/00* (2006.01)
*H04L 12/28* (2006.01)

(52) U.S. Cl.
CPC ........ *H04Q 11/0067* (2013.01); *H04L 12/2859* (2013.01); *H04L 12/2885* (2013.01);
(Continued)

(58) Field of Classification Search
CPC ........... H04L 12/2859; H04L 12/2885; H04Q 11/0067; H04Q 11/0071; H04Q 2011/0079

USPC ................ 398/66, 58, 67; 370/401, 229, 465; 709/227
See application file for complete search history.

(56) References Cited

U.S. PATENT DOCUMENTS

| 2007/0133576 A1* | 6/2007 | Tsuge et al. .................. 370/401 |
| 2007/0201487 A1 | 8/2007 | Lin et al. |

(Continued)

FOREIGN PATENT DOCUMENTS

| CN | 101374046 A | 2/2009 |
| CN | 101453669 A | 6/2009 |

OTHER PUBLICATIONS

ITU-T Telecommunication Standardization Sector of ITU, Gigabit-capable Passive Optical Networks (G-PON): ONT management and control interface specification, G.984.4, Feb. 2008, p. 179.*

(Continued)

*Primary Examiner* — David Payne
*Assistant Examiner* — Omar S Ismail
(74) *Attorney, Agent, or Firm* — Bright IP Law Offices (57) ABSTRACT

The disclosure discloses a Point-to-Point Protocol over Ethernet (PPPOE) configuration method for a Gigabit-Capable Passive Optical Network (GPON) system. The method comprises: an Optical Line Terminal (OLT) instructing an Optical Network Unit (ONU) to create or delete a PPPoE management object instance and associate the PPPoE management object instance with an IP host config data management object instance; and the ONU creating the PPPoE management object instance according to the creation instruction from the OLT, and turning on a PPPoE function switch in the IP host config data management object instance; or the ONU deleting the PPPoE management object instance according to the deletion instruction from the OLT, and turning of the PPPoE function switch in the IP host config data management object instance. The disclosure also discloses a GPON system. With the disclosure, the problem that the existing GPON system cannot support accessing in a manner of PPPoE dial-up is solved, and the PPPoE scenario requirements are met.

7 Claims, 3 Drawing Sheets

(52) U.S. Cl.
CPC .... *H04Q11/0071* (2013.01); *H04Q 2011/0079* (2013.01); *H04Q 2213/1301* (2013.01); *H04Q 2213/13109* (2013.01)

(56) References Cited

U.S. PATENT DOCUMENTS

| | | | |
|---|---|---|---|
| 2008/0130633 A1* | 6/2008 | Ying et al. | 370/352 |
| 2008/0162702 A1* | 7/2008 | Jia et al. | 709/227 |
| 2008/0273878 A1* | 11/2008 | Wu et al. | 398/67 |
| 2008/0285972 A1* | 11/2008 | Takeuchi et al. | 398/60 |

OTHER PUBLICATIONS

P.R. China, State Intellectual Property Office, International Search Report for International Application No. PCT/CN2010/079387, mailed Mar. 17, 2011.

ITU-T G984.4, Gigabit-capable Passive Optical Networks (G-PON): ONT management and control interface specification, section 9.4.12, Appendix I, Feb. 29, 2008.

* cited by examiner

GIGABIT-CAPABLE PASSIVE OPTICAL NETWORK (GPON) SYSTEM AND POINT-TO-POINT PROTOCOL OVER ETHERNET (PPPOE) CONFIGURATION METHOD IMPLEMENTED THEREBY

CROSS REFERENCE TO RELATED APPLICATIONS

This application is the U.S. National Stage of International Patent Application No. PCT/CN2010/079387 filed on Dec. 2, 2010, which claims priority to Chinese Patent Application No. 201010149796.9 filed on Apr. 15, 2010. Both the PCT Application and Chinese Application are hereby incorporated by reference in their entirety.

FIELD OF THE INVENTION

The disclosure relates to a Gigabit-capable Passive Optical Network (GPON) technology in the field of optical access communications, and in particular to a GPON system and a Point-to-Point Protocol over Ethernet (PPPOE) configuration method implemented thereby.

BACKGROUND OF THE INVENTION

Figure 1:
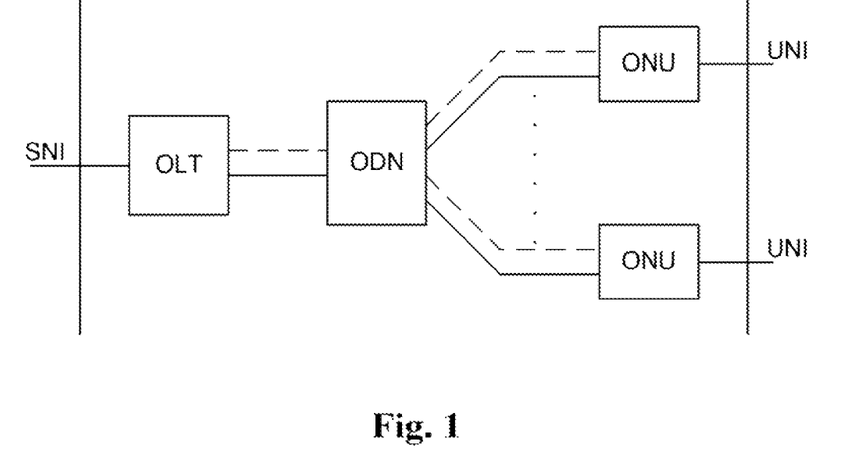
FIG. 1 shows a diagram of a network architecture of GPON access in the conventional art.

GPON is a point-to-multipoint optical access technology. The network architecture of GPON access is as shown in FIG. 1, in which, an Optical Line Terminal (OLT) is a central-office device of the GPON; an Optical Network Unit (ONU) is a user end device; the OLT is connected with the ONU through an Optical Distribution Network (ODN) formed by a passive optical splitter device; an ONU Management and Control Interface (OMCI) provides a management and control channel from the OLT to the ONU; in FIG. 1, a full line represents a service channel and a dash line represents an OMCI management channel.

Standard G.984 series of the International Telecommunication Union-Telecommunication Standardization Sector (ITU-T) is GPON technical standards, in which, G984.4 defines an OMCI standard. The G.984.4 specifically defines a general mechanism of the OMCI, related Management Entity (ME) and so on; the OLT configures the related ME through the OMCI, thereby implementing remote configuration and management of the ONU.

A GPON system mainly applies to application scenes such as Fibre To The X (FTTx), and supports the access of multiple services, including surfing the internet, Voice over Internet Protocol (VoIP), Internet Protocol TV (IPTV) and Circuit Emulation Service (CES). For a service born by an IP message, for example, VoIP, Pseudo-Wire Emulation Edge to Edge (PWE3) and so on, there is an instance of one or more IP host MEs on the ONU. Each IP host bearing a service must have a valid IP address; generally, the IP address of the IP host is statically configured (static) or automatically acquired through a Dynamic Host Configuration Protocol (DHCP), wherein the static configuration mode needs to occupy relatively more address resources and is complex to manage; and the DHCP mode has certain safety hazard.

A PPPoE is employed to establish a virtual connection between a user and a central-office authentication server, and the communication, negotiation and configuration of an IP address are performed on this connection. Since the PPPoE dial-up mode has higher security, stability and manageability and occupies relatively less resources, the PPPoE dial-up mode has been widely used.

At present, G.984.4 supports two modes, namely, static and DHCP, which are implemented by configuring an IP host config data ME, wherein the definition of the ME is as follows:
1. ME: IP host config data.
2. data relationship: association with an ONU ME, wherein Transmission Control Protocol (TCP)/User Datagram Protocol (UDP) ME created subsequently can direct to this ME.
3. ME attributes:
    3.1. ME id: this attribute uniquely identifies each instance of this managed entity. The ONT creates as many instances as there are independent IP stacks on the ONT; this attribute is read-only and mandatorily implemented, with a length of 2 bytes. The term "mandatorily implemented" refers that the requirement of an attribute field defined by an ME on a device is not optional but must be supported,
    3.2. IP options: this attribute is a bit map table that enables or disables IP-related options, wherein value 1 indicates that the option is enabled and 0 indicates that the option is disabled;
    0x1 Enable DHCP;
    0x2 Respond to pings;
    0x4 Respond to a traceroute messages;
    0x8 . . . 0x80 Reserved;
    this attribute is readable, writable and mandatorily implemented, with a length of 1 byte.
    3.3. Media Access Control (MAC) address: this attribute indicates the MAC address used by the IP node, and is read-only and mandatorily implemented, with a length of 6 bytes.
    3.4. ONU identifier: which is a unique character string of the ONU identifier; if the ONU identifier is set to be non-null, the character string is used instead of the MAC address when a DHCP parameter is acquired; if the character string is of less than 25 characters, the character string must be null terminated. The default value is 25 null characters. This attribute is readable, writeable and mandatorily implemented, with a length of 25 bytes.
    3.5. IP address: which is an address used for IP host service, with a default value of 0 (not set); if this value is set, it would overwrite any value acquired through the DHCP. This attribute is readable, writeable and mandatorily implemented, with a length of 4 bytes.
    3.6. Mask: which is a sub-net mask used for IP host service, with a default value of 0 (not set); if this value is set, it would overwrite any value acquired through the DHCP. This attribute is readable, writeable and mandatorily implemented, with a length of 4 bytes.
    3.7. Gateway: which is a default gateway used for IP host service, with as default value of 0 (not set); if this value is set, it would overwrite any value acquired through the DHCP. This attribute is readable, writeable and mandatorily implemented, with a length of 4 bytes.
    3.8 Primary Domain Name System (DNS): which represents the address of the primary DNS server, with a default value of 0 (not set); if this value is set, it would overwrite any value acquired through the DHCP. This attribute is readable, writeable and mandatorily implemented, with a length of 4 bytes.
    3.9. Secondary DNS: which represents the address of the secondary DNS server, with a default value of 0 (not set); if this value is set, it would overwrite any value acquired through the DHCP. This attribute is readable, writeable and mandatorily implemented, with a length of 4 bytes.
    3.10. Current address: which is the current address of the IP host service; an ONU updates this attribute after the DHCP assigns a new address. This attribute is read-only and optional, with a length of 4 bytes.

3.11. Current mask: which is the current subnet mask for the IP host service; the ONU updates this attribute if the DHCP assigns a new subnet mask. This attribute is read-only and optional, with it length of 4 bytes.

3.12. Current gateway: which is the current default gateway for the IP host service; the ONU updates this attribute if the DHCP assigns a new gateway. This attribute is read-only and optional, with a length of 4 bytes.

3.13. Current primary DNS: which represents the address of the current primary DNS server; the ONU updates this attribute if the DHCP assigns a new address. This attribute is read-only and optional, with a length of 4 bytes.

3.14. Current secondary DNS: which represents the address of the current secondary DNS server; the ONU updates this attribute if the DHCP assigns a new address. This attribute is read-only and optional, with a length of 4 bytes.

3.15. Domain name: this attribute indicates the domain name allocated by the DHCP; if no domain name is allocated, this attribute is set to be a null character string; if the character string is of less than 25 bytes, the character string must be null terminated. The default value is 25 null characters. This attribute is read-only and mandatorily implemented, with a length of 25 bytes.

3.16. Host name: this attribute indicates the host name allocated by the DHCP; if no host name is allocated, this attribute is set to be a null character string; if the character string is of less than 25 bytes, the character string must be null terminated. The default value is 25 null characters. This attribute is read-only and mandatorily implemented, with a length of 25 bytes.

The inventor finds that the OLT configuring the IP host config data ME through the OMCI can adopt two modes, namely, static and DHCP, but cannot support accessing in a manner of PPPoE dial-up, because there is only one "Enable DHCP" option in the IP option field of 3.2; when this option is enabled, the configuration adopts the DHCP mode; when this option is disabled, the configuration adopts the static mode; and only one of the above two can be selected. Since the PPPoE dial-up cannot be configured through the OMCI and the accessing in a manner of PPPoE dial-up is not supported, the application of the GPON system is limited, which is not good for the development of GPON service.

SUMMARY OF THE INVENTION

The disclosure provides a GPON system and a PPPoE configuration method implemented thereby, to solve the problem that the existing GPON system cannot support accessing in a manner of PPPoE dial-up.

The technical solution of the disclosure is realized as follows.

The disclosure provides a PPPOE configuration method for a GPON system, which comprises:

an OLT instructing an ONU to create or delete a PPPoE management object instance and associate the PPPoE management object instance with an IP host config data management object instance; and the ONU creating the PPPoE management object instance according to the creation instruction from the OLT, and turning on a PPPoE function switch in a IP host config data management object instance; or the ONU deleting the PPPoE management object instance according to the deletion instruction from the OLT, and turning off the PPPoE function switch in the IP host config data management object instance.

The method further comprises: the ONU setting an identifier of the PPPoE management object instance to be the same as an identifier of the IP host config data management object instance corresponding to the IP host, according to an instruction from the OLT of associating the PPPoE management object instance with the IP host config data management object instance.

The method further comprises: the ONU determining the on or off of the PPPoE function, according to whether the PPPoE management object instance exists or according to the PPPoE function switch in the IP host config data management object instance.

The ONU determining the on or off of the PPPoE function according to the PPPoE function switch in the IP host config data management object instance specifically includes:

when the value of an IP option in the IP host config data management object instance indicates enabling PPPoE, determining that the PPPoE function is on; otherwise, determining that the PPPoE function is off.

The PPPoE management object instance includes a PPPoE dial-up parameter, and the method further comprises:

the OLT instructing the ONU to modify the PPPoE dial-up parameter, after the ONU creates the PPPoE management object instance;

the ONU modifying the PPPoE dial-up parameter in the corresponding PPPoE management object instance, according to the received modification instruction.

The disclosure also provides a GPON system, which comprises: an OLT and an ONU, wherein the OLT is configured to instruct the ONU to create or delete a PPPoE management object instance and associate the PPPoE management object instance with an IP host config data management object instance; and the ONU is configured to create the PPPoE management object instance according to the creation instruction from the OLT and to turn on a PPPoE function switch in the IP host config data management object instance; or the ONU is configured to delete the PPPoE management object instance according to the deletion instruction from the OLT and to turn off the PPPoE function switch in the IP host config data management object instance.

The ONU is further configured to set an identifier of the PPPoE management object instance to be the same as an identifier of the IP host config data management object instance corresponding to the IP host, according to an instruction from the OLT of associating the PPPoE management object instance with the IP host config data management object instance.

The ONU is further configured to determine the on or off of the PPPoE function, according to whether the PPPoE management object instance exists or according to the PPPoE function switch in the IP host config data management object instance.

The ONU is further configured to: when the value of an IP option in the IP host config data management object instance indicates enabling PPPoE, determine that the PPPoE function is on; otherwise, determine that the PPPoE function is off.

The ONU is further configured to instruct the ONU to modify a PPPoE dial-up parameter after the ONU creates the PPPoE management object instance;

correspondingly, the ONU is further configured to modify the PPPoE dial-up parameter in the corresponding PPPoE management object instance according to the received modification instruction.

In the GPON system and the PPPoE configuration method implemented thereby provided by the disclosure, the OLT instructs the ONU to create or delete a PPPoE management object instance and associate the PPPoE management object instance with an IP host config data management object instance; and the ONU creates the PPPoE management object instance according to the creation instruction from the OLT, and turns on a PPPoE function switch in the IP host config data management object instance; or the ONU deletes the PPPoE management object instance according, to the deletion instruction from the OLT, and turns off the PPPoE function switch in the IP host config data management object instance. According to the system and the method of the disclosure, the problem that the existing GPON system cannot support accessing in a manner of PPPoE dial-up is solved, and the PPPoE scenario requirements are met.

DETAILED DESCRIPTION OF THE EMBODIMENTS

The technical solution of the disclosure is illustrated below in further detail in conjunction with accompanying drawings and specific embodiments.

A PPPoE configuration method provided by the disclosure for a GPON system comprises: an OLT instructing an ONU to create or delete a PPPoE management object instance and associate the PPPoE management object instance with an IP host config data management object instance; the ONU creating the PPPoE management object instance according to the creation instruction from the OLT, and turning on a PPPoE function switch in the IP host config data management object instance; or the ONU deleting the PPPoE management object instance according to the deletion instruction from the OLT, and turning off the PPPoE function switch in the IP host config data management object instance;

in which, the step of associating the PPPoE management object instance with the IP host config data management object instance specifically includes: setting an identifier of the PPPoE management object instance to be the same as an identifier of the IP host config data management object instance corresponding to the IP host. Thus, the ONU can determine the on or off of the PPPoE function, according to whether the PPPoE management object instance exists or according to the PPPoE function switch in the IP host config data management object instance.

The above PPPoE configuration method is illustrated below in further detail. In following embodiments, the PPPoE management object instance is an extended IP host config data management object, and examples of the definition of the extended IP host config data management object are provided below:

1. ME: extended IP host config data.
2. data relationship: an OLT creates and deletes a corresponding instance according to whether a certain IP host adopts the PPPoE mode. Each IP host config data ME instance corresponds to one or zero extended IP host config data ME instance. The fact that there is zero extended IP host config data ME instance indicates that the extended IP host config data ME instance is not created, that is, the PPPoE mode is not enabled.
3. ME attributes:
3.1. ME id: this attribute is a unique identifier of each instance of this ME; this identifier is the same as the identifier of the IP host config data ME and is thus associated with the IP host config data ME, this attribute is read-only, set up by creation and mandatorily implemented, and has a length of 2 bytes. The term "set up by creation" means that the value of the field corresponding to this attribute is set when the instance is created.
3.2. Network Address Translation (NAT) enabled: this attribute defines NAT enabled (true) or disabled (false), with a default value of false: this attribute is readable, writable, set up by creation and mandatorily implemented, having a length of 1 byte.
3.3. PPPoE mode: this attribute specifies the PPPoE mode used by an ONU, wherein the valid value includes:
0x00: a default value (Auto), which indicates that the default authentication mode of the ONU is adopted;
0x01: a Challenge Handshake Authentication Protocol (CHAP), which indicates the CHAP authentication mode is adopted;
0x02: a Password Authentication Protocol (PAP), which indicates that the PAP authentication mode is adopted;
this attribute is readable, writable, set up by creation and mandatorily implemented, having a length of 1 byte.
3.4. connection triggering mode: this attribute specifies the triggering mode of a PPPoE connection, wherein the valid value includes:
0x00: a default value (Always), which indicates that the PPPoE connection is always kept;
0x01: On Demand, which indicates the PPPOE connection is triggered as needed;
0x02: Manual, which indicates that the PPPoE connection needs to be triggered manually;
this attribute is readable, writable, set up by creation and mandatorily implemented, having a length of 0.1 byte.
3.5. connection release timer: this attribute sets the timer for release, with a unit of second, wherein 0 indicates that the ONU adopts an internal default policy, with a default value of 1200 seconds; this attribute is readable, writable, set up by creation and mandatorily implemented, and has a length of 2 bytes.
3.6. user name: this attribute indicates the name of a user; if the character string is of less than 25 bytes, the character string must be ended with a null character; this attribute is readable, writable and mandatorily implemented, with a length of 25 bytes.
3.7. password: this attributes represents the password; if the character string is of less than 25 bytes, the character string must be ended with a null character; this attribute is readable, writable and mandatorily implemented, with a length of 25 bytes.

3.8, state: this attribute indicates the state of PPPoE, wherein the valid value includes:
0: unconfigured which indicates that the PPPOE connection is not configured;
1: connecting, which indicates that the connection is in progress;
2: authenticating, which indicates that the authentication is in progress;
3: connected, which indicates that the connection is established;
4: pending disconnect, which indicates that the decision of disconnection is in progress;
5: disconnecting, which indicates that the disconnection is in progress;
6: disconnected, which indicates that the connection is down;
7: demand, which indicates that the connection is needed; this attribute is read-only and mandatorily implemented, having a length of 1 byte.
3.9: online duration, which indicates the online duration of the PPPoE connection, with a unit of second; this attribute is read-only and mandatorily implemented, having a length of 4 bytes.

In an Embodiment 1 of the disclosure, an ONU determines the on or off of a PPPoE function according to whether a PPPoE management object instance exists.

Figure 2:
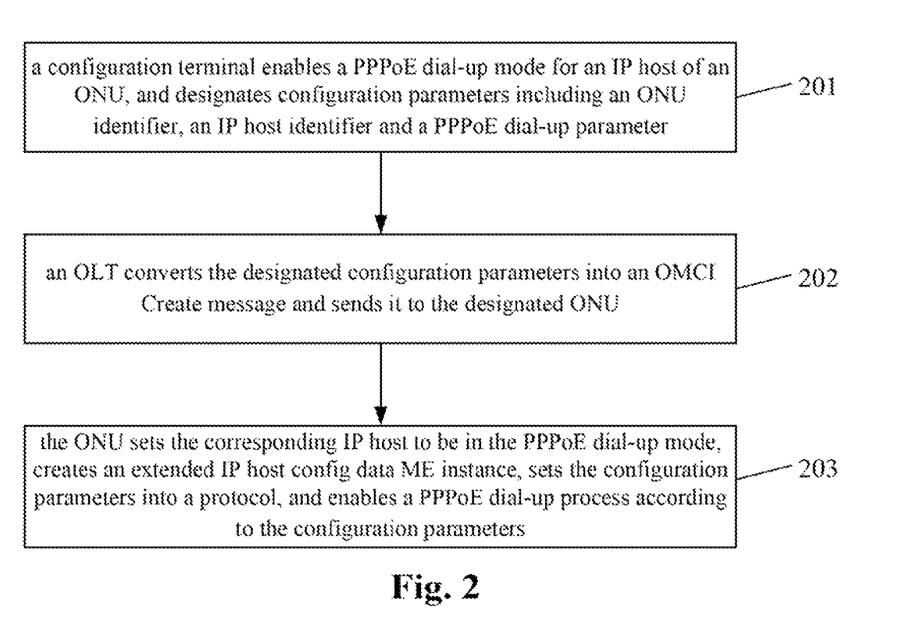
FIG. 2 shows a flowchart of instructing an ONU to create a PPPoE management object instance in an Embodiment 1 of the disclosure.

The process of instructing an ONLY to create a PPPoE management object instance is as shown in FIG. 2 and mainly comprises the following steps:

Step 201: a configuration terminal enables a PPPoE dial-up mode for an IP host of the ONU, and designates configuration parameters including an ONU identifier, an IP host identifier and a PPPoE dial-up parameter.

Step 202: an OLT converts the designated configuration parameters into an OMCI Create message and sends it to the designated ONU.

The configuration parameters designated in Step 201 are converted into the OMCI Create message at the OLT side before being sent to the designated ONU; in the OMCI Create message, the ME is identified as extended IP host config data; an identifier of the instance is consistent with an identifier of the instance of the IP host; and the value of the attribute field of the instance is set to be consistent with each parameter in Step 201.

Step 203: the ONU processes the OMCI Create message and sets the corresponding IP host to be in the PPPoE dial-up mode, creates an extended IP host config data ME instance, sets the configuration parameters into a protocol, and enables a PPPoE dial-up process according to the configuration parameters; and returns a Create response message to the OLT.

After the ONU receives the OMCI Create message of the extended IP host config data ME instance and operates successfully, the ONU ignores the static or DCHP mode configured by the IP host config data ME instance on the corresponding IP host.

Figure 3:
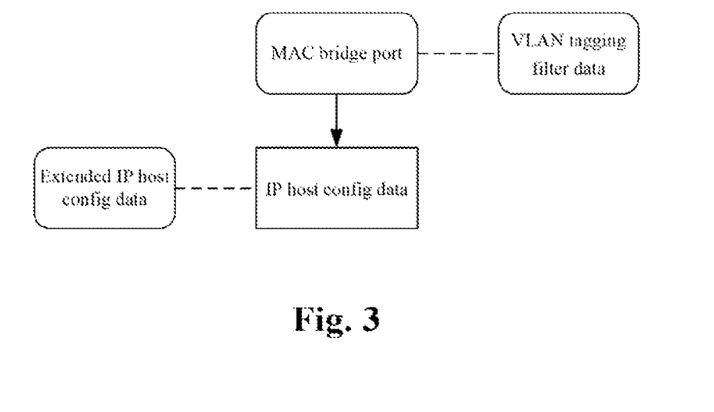
FIG. 3 shows a diagram of an association relationship among an extended IP host config data ME instance, an IP host config, data ME instance, an MAC bridge port and VLAN tagging filter data.

In the PPPoE mode, a service-bearing MAC bridge port still adopts an instance associated with the IP host config data; and a corresponding Virtual Local Area Network (VLAN) item is also configured on this MAC bridge port. The configuration of the VLAN is also accomplished by executing a corresponding command on a corresponding configuration terminal after the VLAN is configured, the PPPoE data would be transmitted through a specified VLAN channel. Data such as IP address, mask and gateway acquired through the PPPoE mode are still acquired through querying: a corresponding field in the IP host config data ME instance; wherein the association relationship among the extended IP host config data ME instance, the IP host config data ME instance, the MAC bridge port and the VLAN tagging filter data is as shown in FIG. 3.

Figure 4:
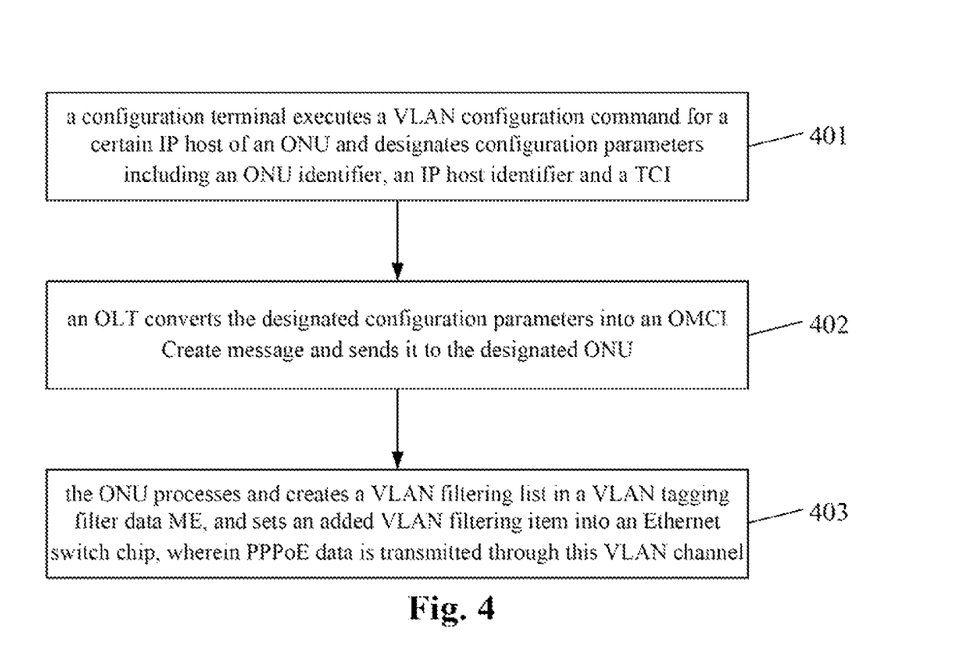
FIG. 4 shows a flowchart of instructing an ONU to configure VLAN in an Embodiment 2 of the disclosure.

The specific operation of VLAN configuration is as shown in FIG. 4, mainly comprising the following steps:

Step 401: a configuration terminal executes a VLAN configuration command for a certain IP host of an ONU, and designates configuration parameters including an ONU identifier, an IP host identifier and a Tag Control Information (TCI).

Step 402: an OLT converts the designated configuration parameters into an OMCI Create message and sends it to the designated ONU.

The configuration parameters designated by the configuration terminal are convened into the OMCI Create message at the OLT side before being sent to the designated ONU; in the OMCI Create message, the ME is identified as VLAN tagging filter data, the instance identifier is the instance identifier of an MAC bridge port corresponding to the IP host config data instance, and the TCI in a VLAN filtering table item is the TCI needing to be added.

Step 403: the ONU processes the OMCI Create message and creates a VLAN filtering list in the VLAN tagging filter data ME, and sets an added VLAN filtering item into an Ethernet switch chip, wherein PPPoE data is transmitted through this VLAN channel: the ONU returns a Create response message to the OLT.

Figure 5:
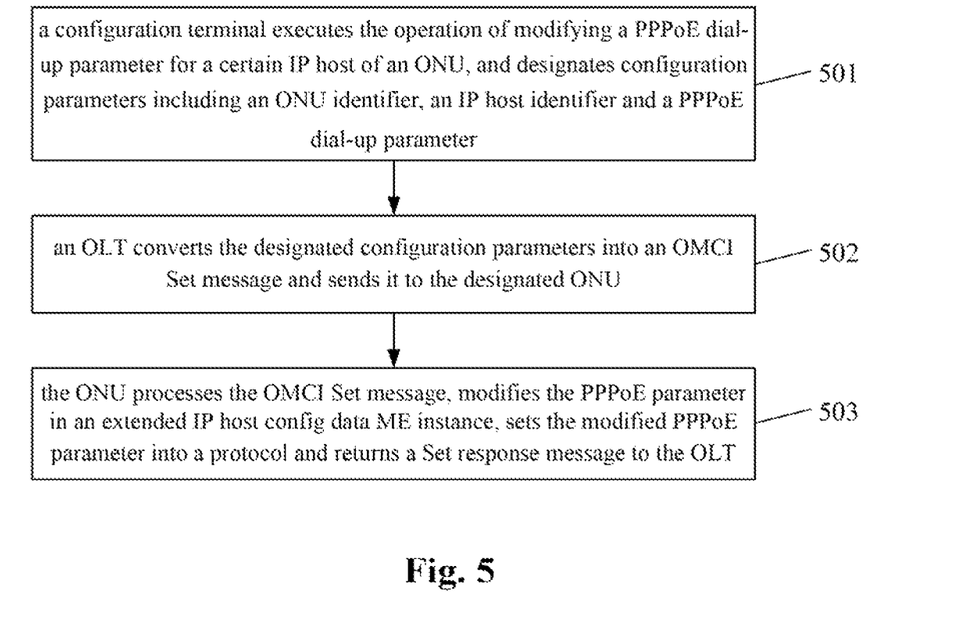
FIG. 5 shows a flowchart of instructing an ONU to modify a PPPoE parameter in an Embodiment 3 of the disclosure.

In addition, according to the requirement of an actual scene, a user can modify a PPPoE dial-up parameter after enabling the PPPoE dial-up mode; the specific operation is as shown in FIG. 5, mainly comprising the following steps:

Step 501: a configuration terminal executes the operation of modifying a PPPoE dial-up parameter for a certain IP host of an ONU, and designates configuration parameters including an ONU identifier, an IP host identifier and a PPPoE dial-up parameter.

Step 502: an OLT converts the designated configuration parameters into an OMCI Set message and sends it to the designated ONU.

The configuration parameters designated in Step 501 are converted into the OMCI Set message at the OLT side before being sent to the designated ONU; in the OMCI Set message, the ME is identified as extended IP host config data, an identifier of the instance is consistent with an identifier of the instance of the IP host, and the value of the attribute field of the instance is set to be consistent with each parameter in Step 501.

Step 503: the ONU processes the OMCI Set message, modifies the PPPoE parameter in the extended IP host config data ME instance, sets the modified PPPoE parameter into a protocol and returns a Set response message to the OLT.

Figure 6:
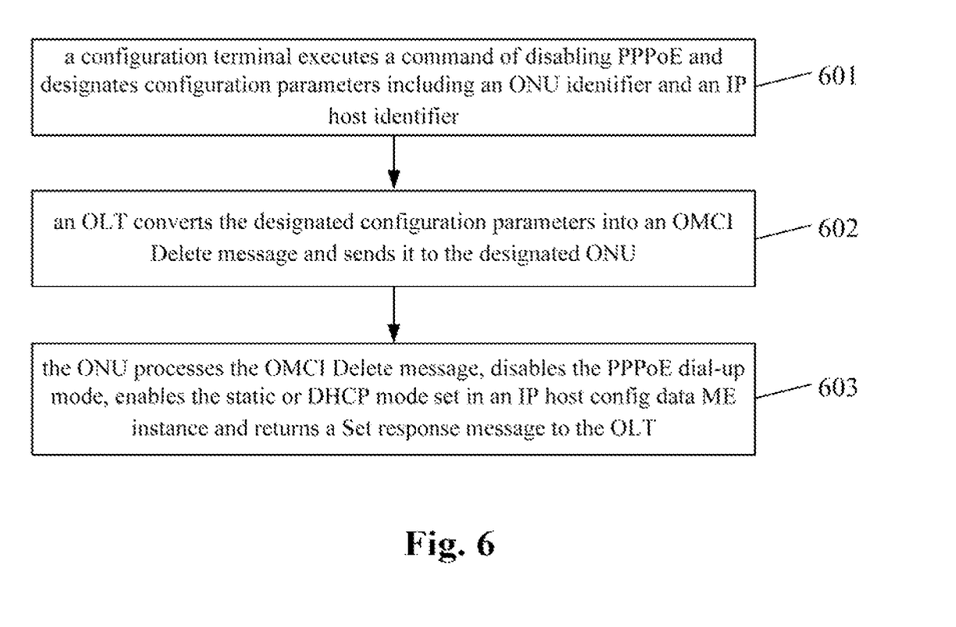
FIG. 6 shows a flowchart of instructing an ONU to disable a PPPoE management object instance according to an Embodiment 4 of the disclosure.

When the PPPoE mode needs to be disabled, the configuration terminal executes the operation of disabling the PPPoE dial-up mode for a certain IP host of the ONU; as shown in FIG. 6, the process mainly comprises the following steps:

Step 601: the configuration terminal executes a command of disabling the PPPoE, and designates configuration parameters including an ONU identifier and an IP host identifier.

Step 602: an OLT converts the designated configuration parameters into an OMCI Delete message and sends it to the designated ONU.

The configuration in Step 601 is converted into an OMCI Delete message at the OLT side to be sent to the ONU, in the OMCI Delete message, the ME is identified as extended IP host config data, and an identifier of the instance is consistent with an identifier of the instance of the IP host.

Step 603: the ONU processes the OMCI Delete message, disables the PPPoE dial-up mode, enables the static or DHCP mode set in an IP host config data ME instance and returns a Set response message to the OLT; wherein the ONU can disable the PPPoE dial-up according to a Delete operation transmitted by the OLT for the extended IP host config data instance; the disable operation is processed by the ONU; for a specific operation process, the ONU can adopt a respective implementation method.

In an Embodiment 2 of the disclosure, an ONU determines the on or off of a PPPOE function according to a PPPOE function switch in an IP host config data management object instance.

Examples of involved IP host config data management objects are provided as follows:
1. ME: IP host config data
2. data relationship: association with an ONU ME, wherein TCP/UDP ME created subsequently can direct to this ME.
3. ME attributes
3.1. ME. id: this attribute uniquely identities each instance of this managed entity. The ONT creates as many instances as there are independent IP stacks on the ONT; this attribute is read-only and mandatorily implemented, with a length of 2 bytes.
3.2. IP options: this attribute is a bit map table that enables or disables IP-related options, wherein value 1 indicates that the option is enabled and 0 indicates that the option is disabled;

| | |
|---|---|
| 0x1 | Enable DHCP; |
| 0x2 | Respond to pings; |
| 0x4 | Respond to a traceroute messages; |
| 0x8 | Enable PPPoE; |
| 0x16 ... 0x80 | Reserved; |

Definitions of following attributes are the same as those in Background and no further description is needed here.

The process of configuring the PPPoE on an ONU and implementing the built-in PPPoE dial-up mode configuration mainly comprises the following steps:

Step 701: an OLT sets the IP option in an IP host config data management object instance to be 0x8 and enables the PPPoE function; in the PPPoE mode, static and DHCP modes configured in IP host config data are neglected, a service-hearing MAC bridge port still adopts an instance associated with the IP host config data, and a corresponding VLAN item also is configured on this MAC bridge port.

Step 702: the ONU creates an instance of extended IP host config data, wherein the identifier of this instance is the same as the identifier of an IP host config data instance corresponding to the IP host.

Step 703: after enabling the PPPoE mode, the ONU can query related state parameters; after the PPPoE dial-up succeeds, the ONU establishes a connection with a Broadband Remote Access Server (BRAS); and the ONU can bear related services such as VOIP, PWE3 and so on through the IP host.

Step 704: the our sets the IP option in the W host config data management object instance to be other values other than 0x8; the PPPoE function is turned off; the extended IP host config data instance is deleted; and the IP host is restored to be in the static or DHCP mode configured in the IP host config data instance.

A GPON system for implementing the above PPPoE configuration method of the disclosure comprises: an OLT and an ONU, wherein the OLT is configured to instruct the ONU to create or delete a PPPoE management object instance and associate the PPPoE management object instance with an W host config data management object instance; and the ONU is configured to create the PPPoE management object instance according to the creation instruction from the OLT and to turn on a PPPoE function switch in the IP host config data management object instance; or the ONU is configured to delete the PPPoE management object instance according to the deletion instruction from the OLT and to turn off the PPPoE function switch in the IP host config data management object instance.

Preferably, the ONU is further configured to set the identifier of the PPPoE management object instance to be the same as an identifier of the IP host config data management object instance corresponding to the IP host, according to an instruction from the OLT of associating: the PPPoE management object instance with the IP host config data management object instance; and to determine the on or off of the PPPoE function, according to whether the PPPoE management object instance exists or according to the PPPoE function switch in the IP host config data management object instance. The ONU is also configured to: when the value of an IP option in the IP host config data management object instance indicates enabling PPPoE, determine that the PPPoE function is on; otherwise, determine that the PPPoE function is off.

The ONU is further configured to instruct the ONU to modify a PPPoE dial-up parameter after the ONU creates the PPPoE management object instance; correspondingly, the ONU is further configured to modify the PPPoE parameter in the corresponding PPPoE management object instance according to the received modification instruction.

The above are only the preferred feasible embodiments of the disclosure, and are not intended to limit the scope of protection of the disclosure. The field of related attributes of the PPPoE can be reduced or extended as actually needed; the enabling and disabling of the PPPoE dial-up mode also can be implemented by expanding existing IP host config, data. To sum up, any equivalent deformation solutions made according to the description and accompanying drawings of the disclosure are deemed to be included in the scope of protection of the disclosure.

What is claimed is:
1. A Point-to-Point Protocol over Ethernet (PPPOE) configuration method for a Gigabit-Capable Passive Optical Network (GPON) system, comprising:
an Optical Line Terminal (OLT) instructing an Optical Network Unit (ONU) to create or delete a PPPoE management object instance and associate the PPPoE management object instance with an IP host config data management object instance; and
the ONU creating the PPPoE management object instance according to the creation instruction from the OLT, and enabling a PPPoE function switch in the IP host config data management object instance; or the ONU deleting the PPPoE management object instance according to the deletion instruction from the OLT, and disabling the PPPoE function switch in the IP host config data management object instance;
wherein the PPPoE management object instance includes a PPPoE dial-up parameter, and the method further comprising: the OLT instructing the ONU to modify the PPPoE dial-up parameter, after the ONU creates the PPPoE management object instance; and the ONU modifying the PPPoE dial-up parameter in the corresponding PPPoE management object instance, according to the received modification instruction.

2. The PPPoE configuration method for a GPON system according to claim 1, further comprising: the ONU setting an identifier of the PPPoE management object instance to be the same as an identifier of the IP host config data management object instance corresponding to the IP host, according to an instruction from the OLT of associating the PPPoE management object instance with the IP host config data management object instance.

3. The PPPoE configuration method for a GPON system according to claim 1, further comprising: the ONU determining the on or off of the PPPoE function, according to whether the PPPoE management object instance exists or according to the PPPoE function switch in the IP host config data management object instance.

4. The PPPoE configuration method for a GPON system according to claim 3, wherein the ONU determining the on or off of the PPPoE function according to the PPPoE function switch in the IP host config data management object instance specifically includes:
when the value of an IP option in the IP host config data management object instance indicates enabling PPPoE, determining that the PPPoE function is on; otherwise, determining that the PPPoE function is off.

5. A GPON system, comprising: an OLT and an ONU,
the OLT is configured to instruct the ONU to create or delete a PPPoE management object instance and associate the PPPoE management object instance with an IP host config data management object instance; and
the ONU is configured to create the PPPoE management object instance according to the creation instruction from the OLT and to enable a PPPoE function switch in the IP host config data management object instance; or the ONU is configured to delete the PPPoE management object instance according to the deletion instruction from the OLT and to disable the PPPoE function switch in the IP host config data management object instance;
wherein the ONU is further configured to determine the on or off of the PPPoE function, according to whether the PPPoE management object instance exists or according to the PPPoE function switch in the IP host config data management object instance; and
the ONU is further configured to instruct the ONU to modify a PPPoE dial-up parameter after the ONU creates the PPPoE management object instance; and correspondingly, the ONU is further configured to modify the PPPoE dial-up parameter in the corresponding PPPoE management object instance according to the received modification instruction.

6. The GPON system according to claim 5, wherein the ONU is further configured to set an identifier of the PPPoE management object instance to be the same as an identifier of the IP host config data management object instance corresponding to the IP host, according to an instruction from the OLT of associating the PPPoE management object instance with the IP host config data management object instance.

7. The PPPoE configuration method for a GPON system according to claim 2, further comprising: the ONU determining the on or off of the PPPoE function, according to whether the PPPoE management object instance exists or according to the PPPoE function switch in the IP host config data management object instance.

* * * * *